US011862141B2

(12) United States Patent
Takahashi

(10) Patent No.: US 11,862,141 B2
(45) Date of Patent: Jan. 2, 2024

(54) SIGNAL PROCESSING DEVICE AND SIGNAL PROCESSING METHOD

(71) Applicant: SONY GROUP CORPORATION, Tokyo (JP)

(72) Inventor: Naoya Takahashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/593,361

(22) PCT Filed: Mar. 13, 2020

(86) PCT No.: PCT/JP2020/011008
§ 371 (c)(1),
(2) Date: Sep. 16, 2021

(87) PCT Pub. No.: WO2020/195924
PCT Pub. Date: Oct. 1, 2020

(65) Prior Publication Data
US 2022/0189496 A1 Jun. 16, 2022

(30) Foreign Application Priority Data
Mar. 27, 2019 (JP) .................. 2019-059819

(51) Int. Cl.
G10L 21/028 (2013.01)
G10L 21/0208 (2013.01)
G10L 25/84 (2013.01)

(52) U.S. Cl.
CPC ........ *G10L 21/028* (2013.01); *G10L 21/0208* (2013.01); *G10L 25/84* (2013.01); *G10L 2021/02087* (2013.01)

(58) Field of Classification Search
CPC .............................. G10L 15/063; G06F 40/35
(Continued)

(56) References Cited

U.S. PATENT DOCUMENTS 9,584,946 B1 * 2/2017 Lyren ...................... G10L 25/81
9,818,431 B2 * 11/2017 Yu ........................ G10L 21/0272
(Continued)

FOREIGN PATENT DOCUMENTS

CN 105550716 A 5/2016
JP 2010-112995 A 5/2010
(Continued)

OTHER PUBLICATIONS

International Search Report and Written Opinion of PCT Application No. PCT/JP2020/011008. dated Jun. 9, 2020, 08 pages of ISRWO.

(Continued)

*Primary Examiner* — Fariba Sirjani
(74) *Attorney, Agent, or Firm* — CHIP LAW GROUP

(57) ABSTRACT

The present technology relates to a signal processing device, a signal processing method, and a program that allow for easier sound source separation. The signal processing device includes a sound source separation unit that recursively performs sound source separation on an input acoustic signal by using a predetermined sound source separation model learned in advance to separate a predetermined sound source from an acoustic signal for learning including the predetermined sound source. The present technology can be applied to a signal processing device.

16 Claims, 6 Drawing Sheets

(58) Field of Classification Search
USPC .......................................................... 704/233
See application file for complete search history.

(56) References Cited

U.S. PATENT DOCUMENTS

| | | | | |
|---|---|---|---|---|
| 10,667,069 | B2* | 5/2020 | Wang | G10L 21/028 |
| 10,839,822 | B2* | 11/2020 | Chen | G10L 25/30 |
| 11,545,157 | B2* | 1/2023 | Wang | G10L 17/04 |
| 2007/0025556 | A1 | 2/2007 | Hiekata | |
| 2014/0074467 | A1* | 3/2014 | Ziv | G10L 25/51 |
| | | | | 704/235 |
| 2015/0025880 | A1* | 1/2015 | Le Roux | G10L 21/0208 |
| | | | | 704/233 |
| 2015/0025887 | A1* | 1/2015 | Sidi | G10L 17/02 |
| | | | | 704/245 |
| 2015/0380010 | A1* | 12/2015 | Srinivasan | H04R 1/025 |
| | | | | 704/227 |
| 2016/0061929 | A1* | 3/2016 | Wu | G01S 3/8006 |
| | | | | 367/124 |
| 2017/0053662 | A1 | 2/2017 | Nakadai | |
| 2017/0372725 | A1* | 12/2017 | Khoury | G10L 25/27 |
| 2019/0139563 | A1* | 5/2019 | Chen | G10L 21/0272 |
| 2019/0341068 | A1* | 11/2019 | Shen | G10L 25/60 |
| 2020/0027462 | A1* | 1/2020 | Wang | G10L 15/28 |
| 2020/0152207 | A1* | 5/2020 | Wang | G10L 17/04 |

FOREIGN PATENT DOCUMENTS

| | | |
|---|---|---|
| JP | 2017-515140 A | 6/2017 |
| JP | 2018-028620 A | 2/2018 |

OTHER PUBLICATIONS

Kolbaek, et al., "Multitalker speech separation with utterance-level permutation invariant training of deep recurrent neural networks", IEEE/ACM Transactions on Audio, Speech, and Language Processing, vol. 25, No. 10, Jul. 11, 2017, pp. 1901-1913.

Hershey, et al., "Deep clustering: Discriminative embeddings for segmentation and separation", Aug. 18, 2015, 10 pages.

Extended European Search Report of EP Application No. 20777151.0 dated Apr. 20, 2022, 07 pages.

Michael Syskind Pedersen, "Source Separation for Hearing Aid Applications", Technical University of Denmark, Informatics and Mathematical Modelling, XP055574232, Nov. 1, 2006, 207 pages.

Liu, et al., "Denoising Auto-Encoder with Recurrent Skip Connections and Residual Regression for Music Source Separation" 17th IEEE International Conference on Machine Learning and Applications (ICMLA), IEEE, XP033502367, Dec. 17-20, 2018 pp. 773-778.

* cited by examiner

SIGNAL PROCESSING DEVICE AND SIGNAL PROCESSING METHOD

CROSS REFERENCE TO RELATED APPLICATIONS

This application is a U.S. National Phase of International Patent Application No. PCT/JP2020/011008 filed on Mar. 13, 2020, which claims priority benefit of Japanese Patent Application No. JP 2019-059819 filed in the Japan Patent Office on Mar. 27, 2019. Each of the above-referenced applications is hereby incorporated herein by reference in its entirety.

TECHNICAL FIELD

The present technology relates to a signal processing device, a signal processing method, and a program, and more particularly, to a signal processing device, a signal processing method, and a program that allow for easier sound source separation.

BACKGROUND ART

For example, there are many situations where it is desired to handle simultaneous utterances of a plurality of speakers separately, such as speech recognition (see, for example, Patent Document 1), captioning, and speech clarification of a plurality of speakers.

As a sound source separation technique for separating an acoustic signal of a mixed speech including utterances of a plurality of speakers into acoustic signals, one for each of the speakers, a technique using direction information (see, for example, Patent Document 2) and a technique assuming independence of sound sources have been conventionally proposed.

However, these techniques have difficulties in being implemented with a single microphone and coping with a situation where sounds from a plurality of sound sources arrive from the same direction.

Thus, as a technique for separating speeches uttered at the same time in such a situation, deep clustering (see, for example, Non-Patent Document 1) and permutation invariant training (see, for example, Non-Patent Document 2) are known.

CITATION LIST

Patent Document

Patent Document 1: Japanese Unexamined Patent Application Publication (Translation of PCT Application) No. 2017-515140
Patent Document 2: Japanese Patent Application Laid-Open No. 2010-112995

Non-Patent Document

Non-Patent Document 1: J. R. Hershey, Z. Chen, and J. Le Roux, "Deep Clustering: Discriminative Embeddings for Segmentation and Separation"
Non-Patent Document 2: M. Kolbaek, D. Yu, Z.-H. Tan, and J. Jensen, "Multitalker speech separation with utterance-level permutation invariant training of deep recurrent neural networks," IEEE/ACM Transactions on Audio, Speech, and Language Processing, vol. 25, no. 10, pp. 1901-1913, 2017

SUMMARY OF THE INVENTION

Problems to be Solved by the Invention

However, in the technologies described above, it is not easy to separate, from a mixed speech in which the number of speakers is unknown, utterances, one for each of the speakers.

For example, in deep clustering and permutation invariant training, it is assumed that the number of speakers who utter at the same time is known.

However, in general, there are many situations where the number of speakers is unknown. In such a case, these techniques additionally require a model for estimating the number of speakers, and it is necessary to switch between algorithms by, for example, preparing a sound source separation model (separation algorithm) for separating utterances of speakers, one for each number of speakers.

Therefore, when these techniques are used to separate a mixed speech, in which the number of speakers is unknown, into utterances, one for each of the speakers, the time for development increases, and the amount of memory for retaining sound source separation models increases. Moreover, in a case where estimation of the number of speakers has not been correctly performed, performance is significantly deteriorated.

The present technology has been made in view of such a situation, and allows for easier sound source separation.

Solutions to Problems

One aspect of the present technology provides a signal processing device including a sound source separation unit that recursively performs sound source separation on an input acoustic signal by using a predetermined sound source separation model learned in advance to separate a predetermined sound source from an acoustic signal for learning including the predetermined sound source.

One aspect of the present technology provides a signal processing method or a program including a step of recursively performing sound source separation on an input acoustic signal by using a predetermined sound source separation model learned in advance to separate a predetermined sound source from an acoustic signal for learning including the predetermined sound source.

In one aspect of the present technology, sound source separation is recursively performed on an input acoustic signal by using a predetermined sound source separation model learned in advance to separate a predetermined sound source from an acoustic signal for learning including the predetermined sound source.

MODE FOR CARRYING OUT THE INVENTION

Figure 1:
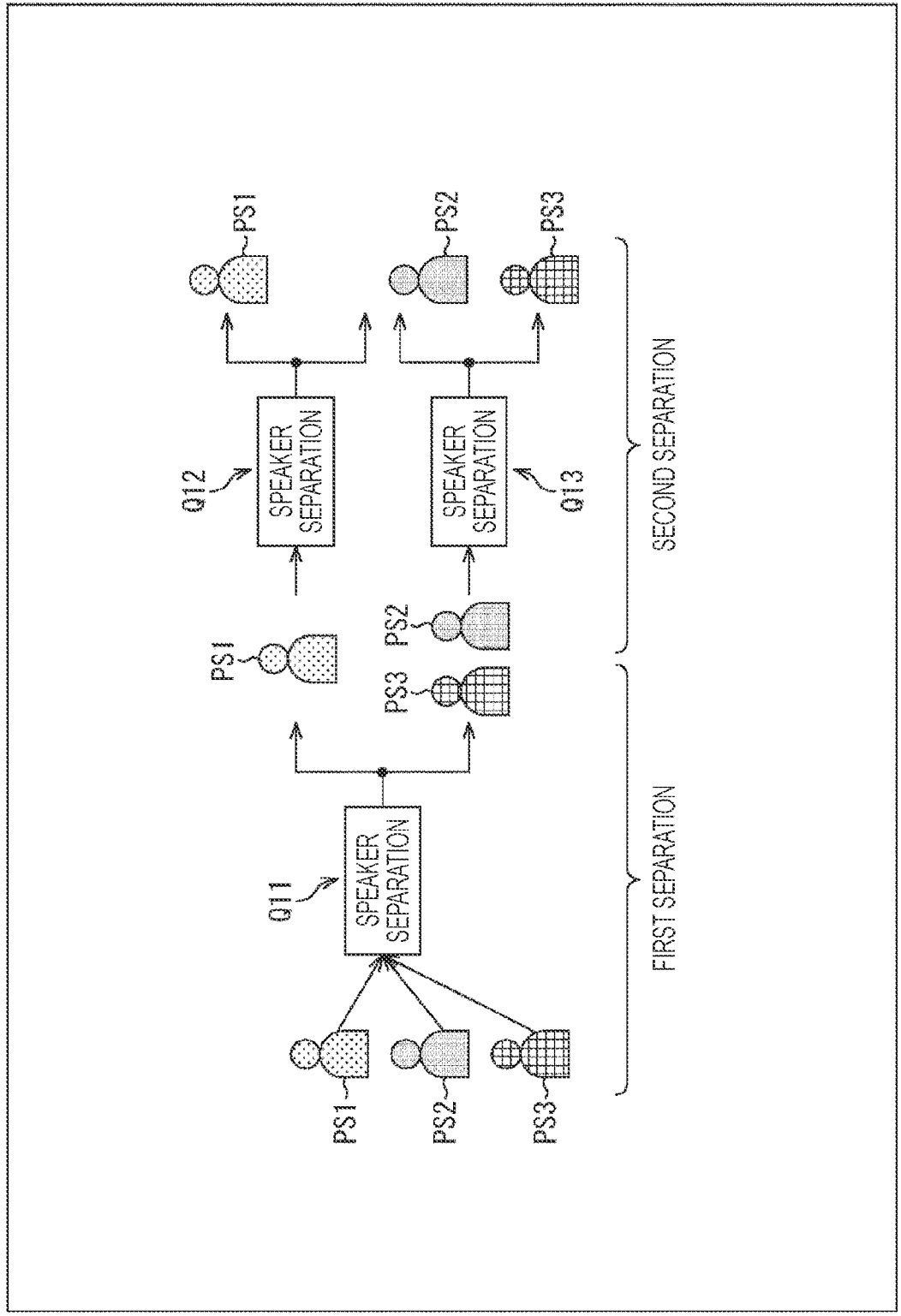
FIG. 1 is a diagram illustrating recursive sound source separation.

Embodiments to which the present technology is applied will be described below with reference to the drawings.

First Embodiment

Present Technology

First, an outline of the present technology will be described. Here, an example will be described in which, from an input acoustic signal obtained by collecting a mixed speech uttered by a plurality of speakers at the same time or at different timings with one or a plurality of microphones, utterances (speeches), one for each of the speakers, are separated by using a single sound source separation model.

In particular, here, the number of speakers included in the mixed speech based on the input acoustic signal is unknown. The present technology makes it possible to more easily separate utterances (speeches), one for each of an unspecified unknown number of speakers from an input acoustic signal by using a single sound source separation model to recursively perform sound source separation on the input acoustic signal.

Note that, in the examples described here, sounds of sound sources are utterances of speakers, but the sounds are not limited this, and may be any sounds such as animal calls or instrument sounds.

The sound source separation models used in the present technology are models such as neural networks learned to separate input speeches on a speaker-to-speaker basis. That is, the sound source separation models have been learned in advance to separate, from an acoustic signal for learning of a mixed speech including an utterance of a speaker as a sound source, an acoustic signal of the utterance of the speaker.

The sound source separation models perform a computation using an arithmetic coefficient in accordance with a predetermined sound source separation algorithm to separate an input acoustic signal into acoustic signals (hereinafter, also referred to as separated signals), one for each of the sound sources (speakers), and are implemented by the sound source separation algorithm and the arithmetic coefficient.

In the present technology, sound source separation using a sound source separation model is performed on an input acoustic signal of a mixed speech in which the number of speakers is unknown or known.

Then, on the basis of the obtained separated signals, it is determined whether or not a predetermined end condition is satisfied. Sound source separation using the same sound source separation model is recursively performed on the separated signals until it is determined that the end condition is satisfied, and finally, separated signals one for each of the sound sources (speakers) are obtained.

Here, as a specific example, a case will be described in which a two-speaker separation model learned to separate an acoustic signal for learning including utterances of two speakers as sound sources into a separated signal including an utterance of one speaker and a separated signal including an utterance of the other speaker is used as a sound source separation model.

Such a sound source separation model can be obtained by learning by using a learning technique such as deep clustering or permutation invariant training.

In the two-speaker separation model, when an input acoustic signal of a mixed speech by two speakers is input, it is expected that separated signals of utterances (speeches), one for each of the speakers, are output as a sound source separation result.

Furthermore, in the two-speaker separation model, when an input acoustic signal of a speech by one speaker is input, it is expected that a separated signal of an utterance of the one speaker and a silent separated signal are output as a sound source separation result.

On the other hand, in a case of an input of the two-speaker separation model, that is, in a case where an input acoustic signal is a signal of a mixed speech of three or more speakers, such a mixed speech is an input that has not appeared at the time of learning of the two-speaker separation model.

In this case, in response to the input of the mixed speech of three speakers, sound source separation is performed such that utterances (speeches) of two speakers are included in one separated signal as illustrated in FIG. 1, for example.

In the example illustrated in FIG. 1, a mixed speech based on an input acoustic signal includes utterances of three speakers, a speaker PS1 to a speaker PS3.

As a result of sound source separation, that is, speaker separation on such an input acoustic signal using the two-speaker separation model as indicated by an arrow Q11, the mixed speech is separated such that one separated signal includes only the utterance of the speaker PS1 and the other separated signal includes only the utterances of the speaker PS2 and the speaker PS3.

Furthermore, for example, as a result of further sound source separation using the two-speaker separation model on the separated signal including only the utterance of the speaker PS1 as indicated by an arrow Q12, the speech is separated such that one separated signal includes only the utterance of the speaker PS1 and the other separated signal is a silent signal.

In a similar manner, for example, as a result of further sound source separation using the two-speaker separation model on the separated signal including only the utterances of the speaker PS2 and the speaker PS3 as indicated by an arrow Q13, the mixed speech is separated such that one separated signal includes only the utterance of the speaker PS2 and the other separated signal includes only the utterance of the speaker PS3.

In this way, when sound source separation is recursively performed on an input acoustic signal by using the same two-speaker separation model, separated signals, each of which includes only a corresponding one of the speaker PS1 to the speaker PS3, are obtained.

In this example, at the time when the first sound source separation indicated by the arrow Q11 is performed, the obtained separated signals include only utterances of at most two speakers. In most cases, the input acoustic signal is not separated into a separated signal of the utterances of the three speakers and a silent separated signal.

Therefore, at the time when the first sound source separation has been performed, all the separated signals are speeches that can be solved by using the two-speaker separation model, that is, signals from which separated signals, one for each of the speakers, can be obtained. Then, recursive sound source separation is performed on such separated signals as indicated by the arrow Q12 and the arrow Q13 so that separated signals, one for each of the speakers, can be obtained.

Note that, even in a case where the input acoustic signal is a mixed speech of utterances of four or more speakers, the number of times of sound source separation recursively performed can be increased so that separated signals, one for each of the speakers, can be finally obtained.

Furthermore, in a case where sound source separation is recursively performed to separate an input acoustic signal into separated signals, one for each of the speakers (to extract separated signals), when the number of speakers of the mixed speech of the input acoustic signal is unknown (not known), an end condition for ending the recursive sound source separation is required.

This end condition is a condition satisfied when a separated signal obtained by the sound source separation includes only an utterance of one speaker, in other words, a condition satisfied when a separated signal does not include utterances of two or more speakers.

Here, as an example, in a case where one separated signal obtained by the sound source separation is a silent signal, in more detail, in a case where an average level (energy) of one separated signal is equal to or less than a predetermined threshold value, it is assumed that the end condition is satisfied, that is, separated signals, one for each of the speakers, are obtained.

According to the present technology as described above, even in a case where the number of speakers of an input acoustic signal is unknown, sound source separation can be easily performed without need for a model for estimating the number of speakers, a sound source separation model for each number of speakers, direction information indicating a direction of a sound source, or the like, and a separated signal of each sound source (speaker) can be obtained.

The present technology therefore significantly suppresses an increase in the time for development of the sound source separation models and the like and an increase in the amount of memory for retaining the sound source separation models.

That is, in the present technology, separated signals, one for each of the speakers, can be obtained by one sound source separation model regardless of the number of speakers of an input acoustic signal, and it is possible to simplify a system, reduce the necessary amount of memory, integrate development of the sound source separation models, and the like.

Moreover, in the present technology, sound source separation is performed recursively so that a problem (task) to be solved by each sound source separation can be simplified, and as a result, separation performance can be improved.

Note that an example of using a two-speaker separation model as the sound source separation model has been described here. However, this is not restrictive, and recursive sound source separation may be performed by a speaker separation model of a plurality of speakers that separates an input acoustic signal into separated signals, one for each of three or more speakers, such as a three-speaker separation model.

For example, the three-speaker separation model is a speaker separation model learned to separate an acoustic signal for learning including utterances of three speakers as sound sources into three separated signals, each of which includes a corresponding one of the utterances of the three speakers, that is, separated signals, one for each of the three speakers.

Configuration Example of Signal Processing Device

Next, a signal processing device to which the present technology is applied will be described.

Figure 2:
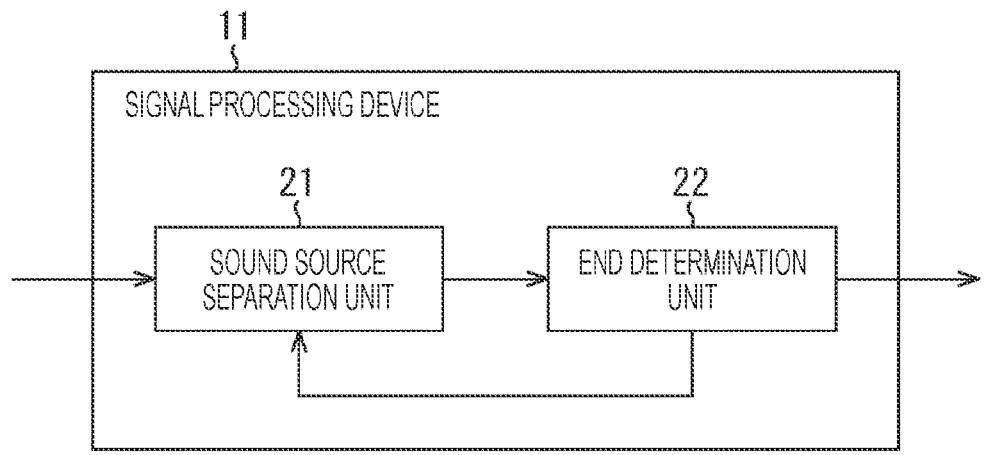
FIG. 2 is a diagram illustrating a configuration example of a signal processing device.

The signal processing device to which the present technology is applied is configured as illustrated in FIG. 2, for example.

A signal processing device 11 illustrated in FIG. 2 has a sound source separation unit 21 and an end determination unit 22.

The sound source separation unit 21 receives an input acoustic signal from the outside. Furthermore, the sound source separation unit 21 retains a sound source separation model obtained in advance by learning.

Note that, in this embodiment, the description will be given on the assumption that the input acoustic signal is an acoustic signal of a mixed speech in which the number of speakers, particularly the number of speakers who have made utterances at the same time, is unknown. Furthermore, here, a sound source separation model retained by the sound source separation unit 21 is a two-speaker separation model.

In accordance with a result of end determination supplied from the end determination unit 22, the sound source separation unit 21 recursively performs, on the basis of the sound source separation model that is retained, sound source separation on the supplied input acoustic signal to obtain separated signals, and supplies the resulting separated signals to the end determination unit 22.

The end determination unit 22 performs end determination to determine whether or not to end the recursive sound source separation, that is, whether or not an end condition is satisfied on the basis of the separated signals supplied from the sound source separation unit 21, and supplies the determination result to the sound source separation unit 21.

Furthermore, if it is determined that the end condition is satisfied, the end determination unit 22 outputs the separated signals obtained by the sound source separation to a subsequent stage as acoustic signals of utterances, one for each of the speakers.

Description of Sound Source Separation Processing

Next, sound source separation processing performed by the signal processing device 11 will be described with reference to a flowchart in FIG. 3.

In step S11, the sound source separation unit 21 performs, on the basis of a sound source separation model that is retained, sound source separation on a supplied input acoustic signal to obtain separated signals, and supplies the resulting separated signals to the end determination unit 22.

Specifically, the sound source separation unit 21 performs arithmetic processing in accordance with a sound source separation algorithm corresponding to the sound source separation model on the basis of an arithmetic coefficient constituting the sound source separation model and the input acoustic signal, and obtains two separated signals, which are an output of the sound source separation model.

In step S12, on the basis of the separated signals supplied from the sound source separation unit 21, the end determination unit 22 performs end determination for each pair (set) of two separated signals obtained by one sound source separation, and determines whether or not all the pairs satisfy an end condition.

Specifically, for example, the end determination unit 22 determines, for one pair, that the pair satisfies the end condition if an average level of one of the two separated signals constituting the pair is equal to or less than a predetermined threshold value.

If it is determined in step S12 that none of the pairs satisfies the end condition, the end determination unit 22 supplies the sound source separation unit 21 with information indicating the pair that does not satisfy the end condition as a result of the end determination, and then the processing proceeds to step S13.

In step S13, on the basis of the result of the end determination supplied from the end determination unit 22, the sound source separation unit 21 performs sound source separation using a sound source separation model on each of the separated signals constituting the pair that does not satisfy the end condition to obtain separated signals, and supplies the resulting separated signals to the end determination unit 22.

For example, in step S13, the same sound source separation model as the one used in step S11 is used for the sound source separation.

Note that the sound source separation may be recursively performed with the use of a plurality of sound source separation models that are different one from each other. For example, a three-speaker separation model may be used for the sound source separation in step S11 and a two-speaker separation model may be used for the sound source separation in step S13.

After the recursive sound source separation is performed in the processing of step S13, the processing returns to step S12, and the processing described above is repeated until it is determined that all the pairs satisfy the end condition.

For example, in the example illustrated in FIG. 1, since one separated signal is a silent signal in the sound source separation indicated by the arrow Q12, the pair of separated signals obtained as a result of the sound source separation indicated by the arrow Q12 satisfies the end condition.

On the other hand, since a silent separated signal cannot be obtained by the sound source separation indicated by the arrow Q13 in FIG. 1, it is not determined that the end condition is satisfied, and recursive sound source separation is performed in step S13 for each of the two separated signals obtained by the sound source separation indicated by the arrow Q13.

Figure 3:
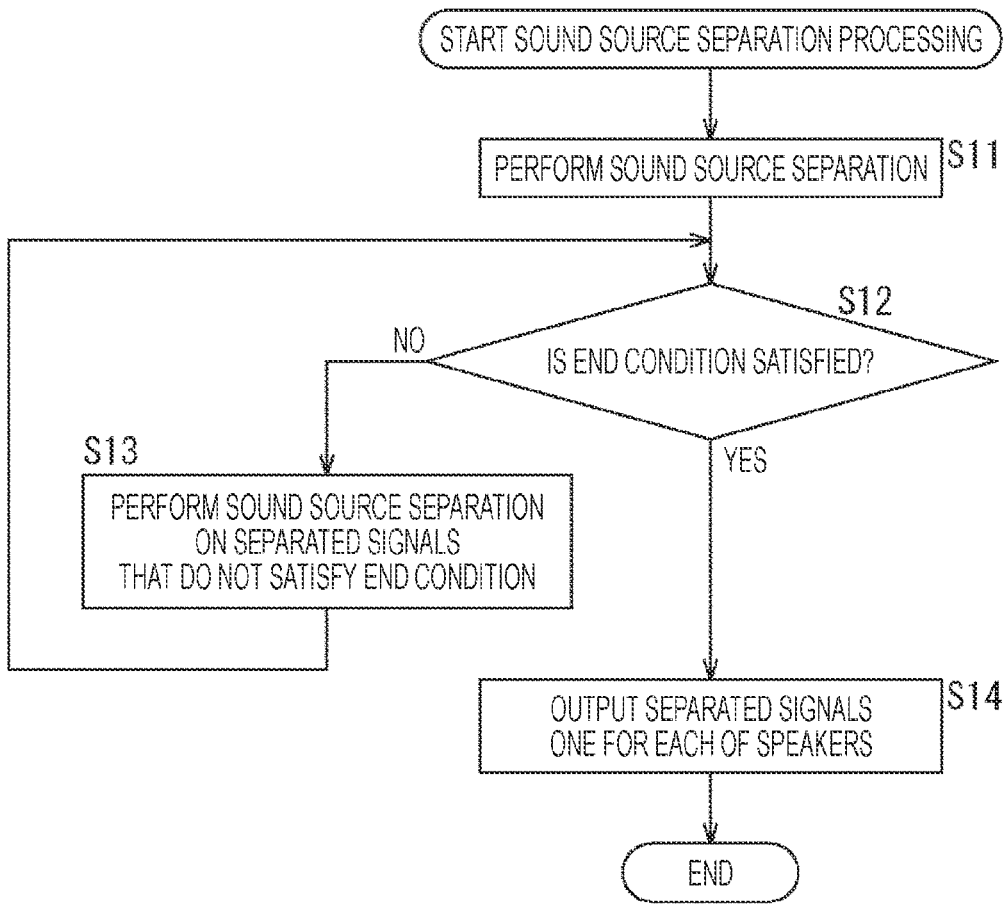
FIG. 3 is a flowchart illustrating sound source separation processing.

Furthermore, if it is determined in step S12 in FIG. 3 that all the pairs satisfy the end condition, the input acoustic signal has been separated into separated signals, one for each of the speakers, and thus the processing proceeds to step S14.

In step S14, the end determination unit 22 outputs, to a subsequent stage, the separated signals, one for each of the speakers, obtained by the sound source separations that have been performed, and the sound source separation processing ends.

As described above, the signal processing device 11 recursively performs the sound source separation on the input acoustic signal until the end condition is satisfied, and obtains the separated signals, one for each of the speakers. In this way, sound source separation can be performed more easily and with sufficient separation performance.

Second Embodiment

Synthesis from Separation Results

Meanwhile, in a case where sound source separation is recursively performed on an input acoustic signal by using a speaker separation model as a sound source separation model, an utterance of a certain speaker may be dispersed into different separation results, that is, different separated signals.

Specifically, for example, as illustrated in FIG. 1, a case is assumed in which sound source separation is performed by using a two-speaker separation model on an input acoustic signal of a mixed speech including utterances of the speaker PS1 to the speaker PS3.

Figure 4:
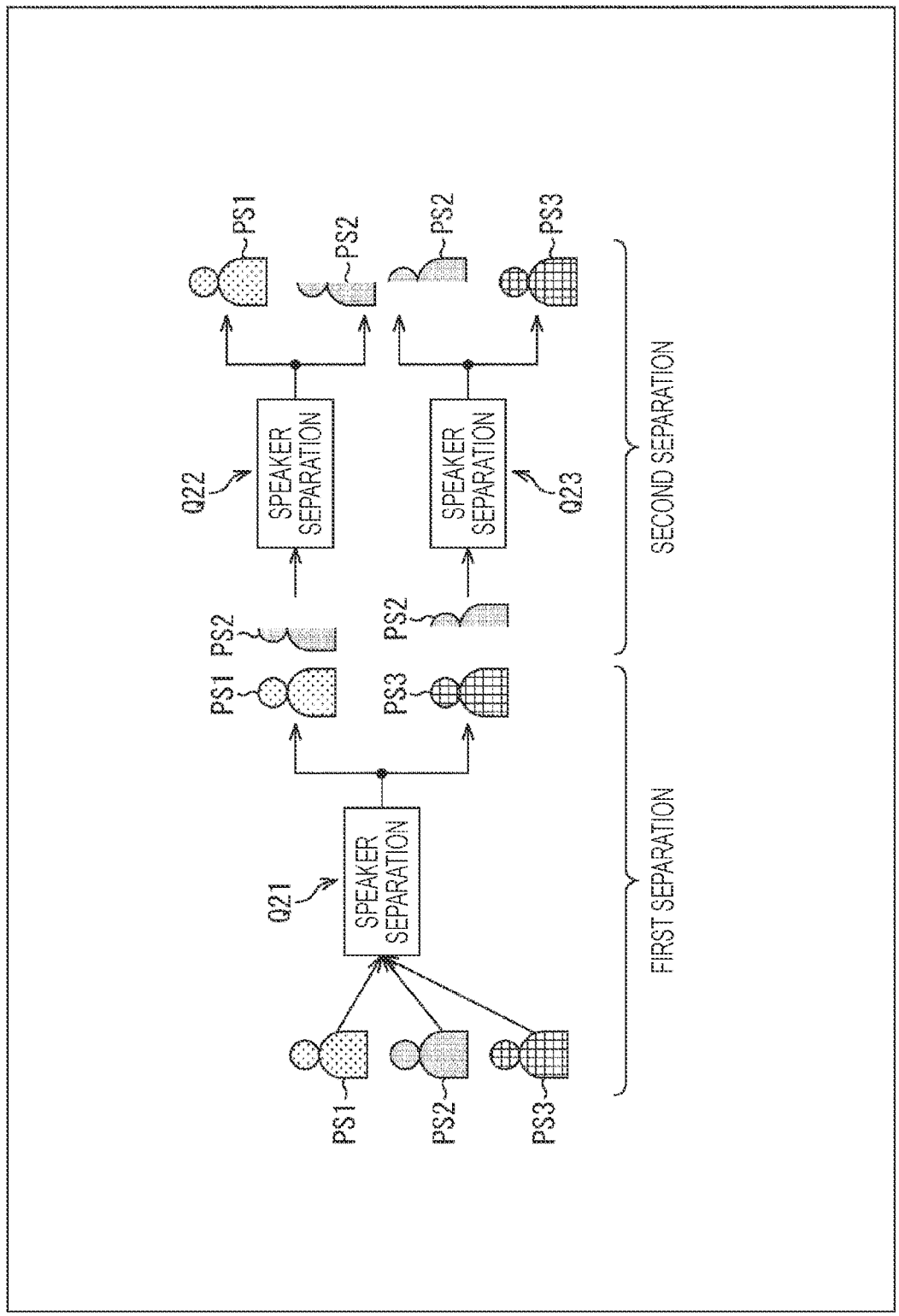
FIG. 4 is a diagram illustrating recursive sound source separation.

In this case, for example, an utterance of a certain speaker may not appear only in one separated signal as in the result of sound source separation indicated by the arrow Q11 in FIG. 1, but may appear in a dispersed manner in two separated signals as illustrated in FIG. 4. Note that, in FIG. 4, the same reference numerals are given to the portions corresponding to those in the case of FIG. 1, and the description thereof will be omitted as appropriate.

In the example illustrated in FIG. 4, sound source separation (speaker separation) is recursively performed by using a two-speaker separation model on an input acoustic signal of a mixed speech including utterances of a speaker PS1 to a speaker PS3.

Here, first, as indicated by an arrow Q21, sound source separation is performed on the input acoustic signal.

As a result, a separated signal including the utterance of the speaker PS1 and a part of the utterance of the speaker PS2 and a separated signal including the utterance of the speaker PS3 and a part of the utterance of the speaker PS2 are obtained.

That is, although each of the utterances of the speaker PS1 and the speaker PS3 appears only in one separated signal, the utterance of the speaker PS2 is dispersed into two separated signals.

Here, recursive sound source separation using the two-speaker separation model as indicated by an arrow Q22 is performed on the separated signal including the utterance of the speaker PS1 and a part of the utterance of the speaker PS2 obtained as a result of the sound source separation indicated by the arrow Q21, so that separated signals, one for each of the speakers, are obtained.

That is, in this example, as a result of the sound source separation indicated by the arrow Q22, a separated signal including only the utterance of the speaker PS1 and a separated signal including only a part of the utterance of the speaker PS2 are obtained.

In a similar manner, recursive sound source separation using the two-speaker separation model as indicated by an arrow Q23 is performed on the separated signal including the utterance of the speaker PS3 and a part of the utterance of the speaker PS2 obtained as the result of the sound source separation indicated by the arrow Q21, so that separated signals, one for each of the speakers, are obtained.

That is, in this example, as a result of the sound source separation indicated by the arrow Q23, a separated signal including only the utterance of the speaker PS3 and a separated signal including only a part of the utterance of the speaker PS2 are obtained.

Even in such an example, each of the resulting separated signals includes only an utterance of one speaker. However, here, the utterance of the speaker PS2 is dispersed into two separated signals.

Thus, two or more separated speeches, that is, separated speeches (utterances) of the same speaker dispersed into a plurality of separated signals may be combined into one synthesized utterance of the speaker.

In such a case, it is possible to use a speaker identification model in which separated signals are input and a speaker identification result is output.

Specifically, for example, a neural network or the like that identifies any large number of speakers is learned in advance as a speaker identification model. Here, in a case where the number of speakers at the time of learning of the speaker identification model is large, it is not necessary that the speakers include speakers who are actual targets of sound source separation.

A speaker identification model is prepared in this way, and then the speaker identification model is used for clustering of separated signals obtained by sound source separation, that is, speakers corresponding to the separated signals.

At the time of clustering, each separated signal is input to the speaker identification model, and speaker identification is performed.

At this time, an output of the speaker identification model, that is, a result of the speaker identification, or an activation (output) of an intermediate layer of the speaker identification model, that is, a computation result in the middle of arithmetic processing for obtaining a speaker identification result, is obtained as a feature value (speaker embedding) representing the speaker corresponding to the input separated signal.

Note that, at the time of calculation of the feature value representing the speaker, a silent section of the separated signal can be ignored in the calculation.

When the feature value has been obtained for each of the separated signals (separated speeches), a distance of the feature values to each other, that is, the distance between the feature values is obtained. Separated signals in which the distance between the feature values is equal to or less than a threshold value is determined to be separated signals of the same speaker.

Moreover, as a result of the clustering, one separated signal is synthesized and obtained from a plurality of separated signals determined to be of the same speaker, as a final separated signal of the speaker.

Therefore, for example, in the example in FIG. 4, the separated signal including only a part of the utterance of the speaker PS2 obtained by the sound source separation indicated by the arrow Q22 and the separated signal including only a part of the utterance of the speaker PS2 obtained by the sound source separation indicated by the arrow Q23 are assumed to be of the same speaker.

Then, the separated signals are added so that one separated signal is synthesized, and the resulting signal is output as a final separated signal including the utterance of the speaker PS2.

Configuration Example of Signal Processing Device

Figure 5:
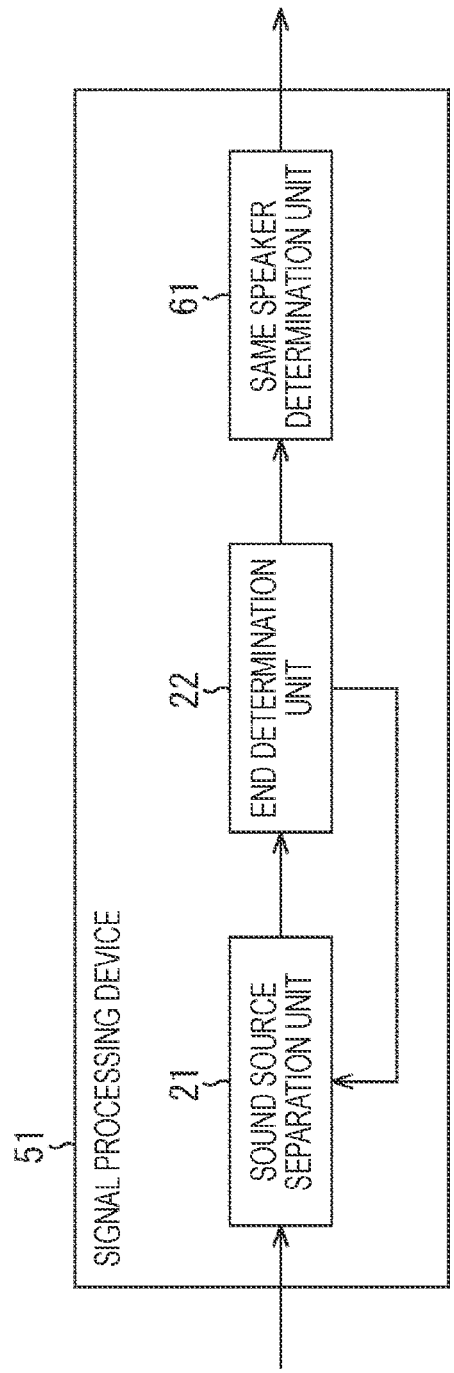
FIG. 5 is a diagram illustrating a configuration example of a signal processing device.

In a case where clustering of separated signals obtained by sound source separation is performed as described above, a signal processing device is configured as illustrated in FIG. 5, for example. Note that, in FIG. 5, the same reference numerals are given to the portions corresponding to those in the case of FIG. 2, and the description thereof will be omitted as appropriate.

A signal processing device 51 illustrated in FIG. 5 has a sound source separation unit 21, an end determination unit 22, and a same speaker determination unit 61.

The configuration of the signal processing device 51 is different from the configuration of the signal processing device 11 in that the same speaker determination unit 61 is newly provided, but is otherwise the same as the configuration of the signal processing device 11.

The same speaker determination unit 61 performs a same speaker determination of determining whether or not a plurality of separated signals obtained by recursive sound source separation is signals of the same speaker, and then synthesizes and generates, in accordance with a result of the determination, a final separated signal of the speaker from the plurality of separated signals of the same speaker.

More specifically, the same speaker determination unit 61 retains a speaker identification model obtained in advance by learning, and performs clustering on the basis of the speaker identification model that is retained and separated signals, one for each of the speakers, supplied from the end determination unit 22. That is, the same speaker determination unit 61 performs a same speaker determination by performing clustering.

Furthermore, the same speaker determination unit 61 performs clustering to synthesize a final separated signal of a speaker from separated signals determined to be of the same speaker, and outputs finally obtained separated signals, one for each of the speakers, to a subsequent stage.

Description of Sound Source Separation Processing

Next, sound source separation processing performed by the signal processing device 51 will be described with reference to a flowchart in FIG. 6.

Note that the processing of step S41 to step S43 is similar to the processing of step S11 to step S13 in FIG. 3, and the description thereof will be omitted.

When recursive sound source separation is performed in step S41 to step S43 and separated signals, one for each of the speakers, are obtained, the separated signals are supplied from the end determination unit 22 to the same speaker determination unit 61, and then the processing proceeds to step S44. That is, if it is determined in step S42 that all the pairs satisfy the end condition, the processing proceeds to step S44.

In step S44, the same speaker determination unit 61 calculates a feature value representing a speaker for each of the separated signals on the basis of the speaker identification model that is retained and the separated signals supplied from the end determination unit 22.

That is, the same speaker determination unit 61 calculates a feature value representing a speaker for each separated signal by performing a computation using the speaker identification model with the separated signal as an input.

In step S45, the same speaker determination unit 61 determines whether or not there are separated signals of the same speaker on the basis of the feature values obtained in step S44. That is, a same speaker determination is performed.

For example, for any two separated signals of all the separated signals, the same speaker determination unit 61 obtains a distance between the feature values of the two separated signals. If the distance is equal to or less than a predetermined threshold value, it is determined that the two separated signals are those (signals) of the same speaker.

For all the separated signals, the same speaker determination unit 61 determines, for all possible combinations of two separated signals, whether or not the two separated signals are of the same speaker.

Then, if a determination result indicating that the two separated signals are not of the same speaker is obtained for all the combinations, the same speaker determination unit 61 determines in step S45 that there are no separated signals of the same speaker.

The same speaker determination unit 61 performs the processing of step S44 and step S45 described above as clustering processing.

If it is determined in step S45 that there are separated signals of the same speaker, the same speaker determination unit 61 synthesizes, from a plurality of separated signals determined to be of the same speaker, a final separated signal of the speaker in step S46.

After final separated signals, one for each of the speakers, are synthesized and obtained from the separated signals of the same speaker, the processing proceeds to step S47.

On the other hand, if it is determined in step S45 that there are no separated signals of the same speaker, separated signals, one for each of the speakers, have already been obtained, so the processing of step S46 is skipped, and the processing proceeds to step S47.

If it is determined in step S45 that there are no separated signals of the same speaker, or if the processing of step S46 is performed, the same speaker determination unit 61 outputs the finally obtained separated signals, one for each of the speakers, to a subsequent stage in step S47, and the sound source separation processing ends.

As described above, the signal processing device 51 recursively performs sound source separation on an input acoustic signal until the end condition is satisfied, and performs clustering of separated signals to perform synthesis from separated signals of the same speaker and obtain final separated signals, one for each of the speakers.

In this way, sound source separation can be performed more easily and with sufficient separation performance. In particular, the signal processing device 51 performs synthesis from separated signals of the same speaker, and this further improves the separation performance as compared with the case of the signal processing device 11.

Third Embodiment

One-to-Many Speaker Separation Model

Meanwhile, in the above, an example has been described in which sound source separation is performed by using an m (where m≥2)-speaker separation model learned so as to separate an acoustic signal of a mixed speech including utterances of m speakers into m separated signals, one for each of the speakers.

In particular, at the time of sound source separation, there is a possibility that an utterance of a predetermined speaker appears in a dispersed manner in a plurality of separated signals. Therefore, in the second embodiment, an example has been described in which clustering is performed and separated signals are synthesized as appropriate.

However, not only such a speaker separation model but also other speaker separation models such as a speaker separation model obtained by performing learning on an uncertain number of speakers (hereinafter, also referred to as a one-to-many speaker separation model) may be used for sound source separation.

The one-to-many speaker separation model is a speaker separation model such as a neural network learned to separate an acoustic signal for learning of a mixed speech of any unknown (uncertain) number of speakers into a separated signal including only an utterance (speech) of a predetermined one speaker and a separated signal including utterances of remaining speakers excluding the predetermined one speaker among a plurality of speakers included in the mixed speech.

Here, a separation result of sound source separation using the one-to-many speaker separation model, that is, an output of the one-to-many speaker separation model is also referred to as a head.

In particular, here, a side on which a separated signal including an utterance of one speaker is output is also referred to as a head 1, and a side on which a separated signal including utterances of other remaining speakers is output is also referred to as a head 2. Furthermore, in a case where it is not particularly necessary to distinguish between the head 1 and the head 2, they are simply referred to as heads.

At the time of learning of the one-to-many speaker separation model, learning is performed so that a loss function L is minimized by using an acoustic signal for learning of the number of speakers m while randomly changing the number of speakers m of the acoustic signal for learning.

At this time, the number of speakers m is set to be equal to or less than a maximum number of speakers M. Furthermore, the one-to-many speaker separation model is learned so that a separated signal including only an utterance of one speaker with the smallest loss among the m speakers included in a mixed speech of the acoustic signal for learnings is an output of the head 1, and a separated signal including utterances of the remaining (m−1) speakers is an output of the head 2 at all times.

Furthermore, the loss function L at the time of learning of the one-to-many speaker separation model is expressed by, for example, the following Formula (1).

[Math. 1]

$$L = \sum_j \min_i L_i^{1,j} + L_j^{2,j} \quad (1)$$

Note that, in Formula (1), j is an index indicating an acoustic signal for learning, that is, a mixed speech for learning, and i is an index indicating a speaker of an utterance included in a j-th mixed speech.

Furthermore, in Formula (1), $L_i^{1,j}$ represents a loss function when an output $s'^1(x^j)$ of the head 1 when sound source separation is performed on an acoustic signal for learning $x^j$ of the j-th mixed speech is compared with an acoustic signal $s_i^j$ of an utterance of an i-th speaker. The loss function $L_i^{1,j}$ can be defined by, for example, a square error shown in the following Formula (2).

[Math. 2]

$$L_i^{1,j} \| s'^1(x^j) - s_i^j \|^2 \quad (2)$$

Moreover, $L_i^{2,j}$ in Formula (1) represents a loss function when an output $s'^2(x^j)$ of the head 2 when sound source separation is performed on the acoustic signal for learning $x^j$ of the j-th mixed speech is compared with a sum of acoustic signals $s_k^j$ of the remaining speakers k other than the i-th speaker. The loss function $L_i^{2,j}$ can be defined by, for example, a square error shown in the following Formula (3).

[Math. 3]

$$L_i^{2,j} = \frac{1}{m-1} \left\| s'^2(x^j) - \sum_{k \neq i} s_k^j \right\|^2 \quad (3)$$

In the one-to-many speaker separation model obtained by learning as described above, it is expected that a separated signal of only an utterance of one speaker is obtained as an output of the head 1, and a separated signal of utterances of the remaining speakers is obtained as an output of the head 2 at all times.

Therefore, for example, in a similar manner to the example illustrated in FIG. 1, it can be expected that separated signals including only utterances, one for each of the speakers, are sequentially separated only by recursively performing sound source separation on an input acoustic signal by using the one-to-many speaker separation model.

In a case where the one-to-many speaker separation model is used in this way, for example, a sound source separation unit 21 of a signal processing device 11 retains the one-to-many speaker separation model obtained in advance by learning, as a sound source separation model. Then, the signal processing device 11 performs the sound source separation processing described with reference to FIG. 3 to obtain separated signals, one for each of the speakers.

However, in this case, in step S11 or step S13, the sound source separation unit 21 performs sound source separation on the basis of the one-to-many speaker separation model. At this time, since an output of the head 1 is a separated signal of an utterance of one speaker, the sound source separation using the one-to-many speaker separation model is recursively performed on an output (separated signal) of the head 2.

Furthermore, in step S12, in a case where an average level of the output (separated signal) of the head 2 of the sound source separation performed most recently is equal to or less than a predetermined threshold value, it is determined that the end condition is satisfied, and the processing proceeds to step S14.

Note that an example of using a one-to-many speaker separation model in which two heads, that is, two outputs of the head 1 and the head 2 are obtained by using one input acoustic signal as an input has been described here.

However, this is not restrictive. For example, sound source separation may be performed by using a one-to-many speaker separation model in which outputs of three heads can be obtained.

In such a case, for example, learning is performed such that outputs of the head 1 and the head 2, among the head 1 to a head 3, are separated signals, each of which includes only an utterance of one speaker, and an output of the head 3 is a separated signal including utterances of other remaining speakers.

Fourth Embodiment

Combination of One-to-Many Speaker Separation Model and Clustering

Moreover, even in a case where a one-to-many speaker separation model is used as a sound source separation model, utterances, one for each sound source, that is, one for each speaker, may not always be completely separated. That is, for example, an utterance of a speaker, which should be output to a head 1, may slightly leak into an output of a head 2.

Therefore, in such a case, an utterance of the same speaker is dispersed in a plurality of separated signals obtained by recursive sound source separation as described with reference to FIG. 4. However, in this case, the utterance of the speaker included in one separated signal is a slightly leaked component, and has a volume of sound much lower than that of the utterance of the speaker included in the other separated signal.

Thus, also in a case where a one-to-many speaker separation model is used as a sound source separation model, clustering may be performed in a similar manner to the second embodiment.

In such a case, for example, a sound source separation unit 21 of a signal processing device 51 retains a one-to-many speaker separation model obtained in advance by learning, as a sound source separation model.

Then, the signal processing device 51 performs the sound source separation processing described with reference to FIG. 6 to obtain separated signals, one for each of the speakers.

However, in this case, in step S41 and step S43, the sound source separation unit 21 performs the sound source separation on the basis of the one-to-many speaker separation model, as in the case of the third embodiment.

Furthermore, in step S44, an output of the speaker identification model or the like described above is calculated as a feature value representing a speaker, and if the distance between the feature values of two separated signals is equal to or less than a threshold value, it is determined that the two separated signals are of the same speaker.

In addition, for example, in a case where a temporal energy variation of a separated signal is obtained as a feature value representing a speaker, and a correlation between feature values of two separated signals, that is, a correlation between the energy variations of the separated signals, is equal to or more than a threshold value, the two separated signals may be determined to be of the same speaker.

Other Modified Example 1

Use of Single-Speaker Determination Model

Meanwhile, in each of the embodiments described above, an example has been described in which it is determined that an end condition of recursive sound source separation is satisfied if an average level (energy) of a separated signal obtained by the sound source separation becomes sufficiently small, that is, if the average level becomes equal to or less than a threshold value.

In this case, when sound source separation is performed on a separated signal including only an utterance of a single speaker, a silent separated signal is obtained and it is determined that the end condition is satisfied.

Therefore, although a separated signal for each speaker is obtained in the first place at the time when the separated signal including only the utterance of the single speaker is obtained, sound source separation needs to be performed one more time, and thus the number of times of sound source separation processing increases accordingly. Such a situation is not preferable for an application or the like with a limited processing time, for example.

Thus, an end determination may be performed by using a single-speaker determination model, which is an acoustic model that receives a separated signal as an input and determines whether the separated signal is an acoustic signal including only an utterance of a single speaker or an acoustic signal of a mixed speech including utterances of a plurality of speakers.

In other words, the single-speaker determination model is an acoustic model for determining whether or not the number of speakers of the utterance included in the input separated signal is one.

In such an example, for example, a single-speaker determination model obtained in advance by learning is retained in an end determination unit 22 of a signal processing device 11 or the signal processing device 51.

Figure 6:
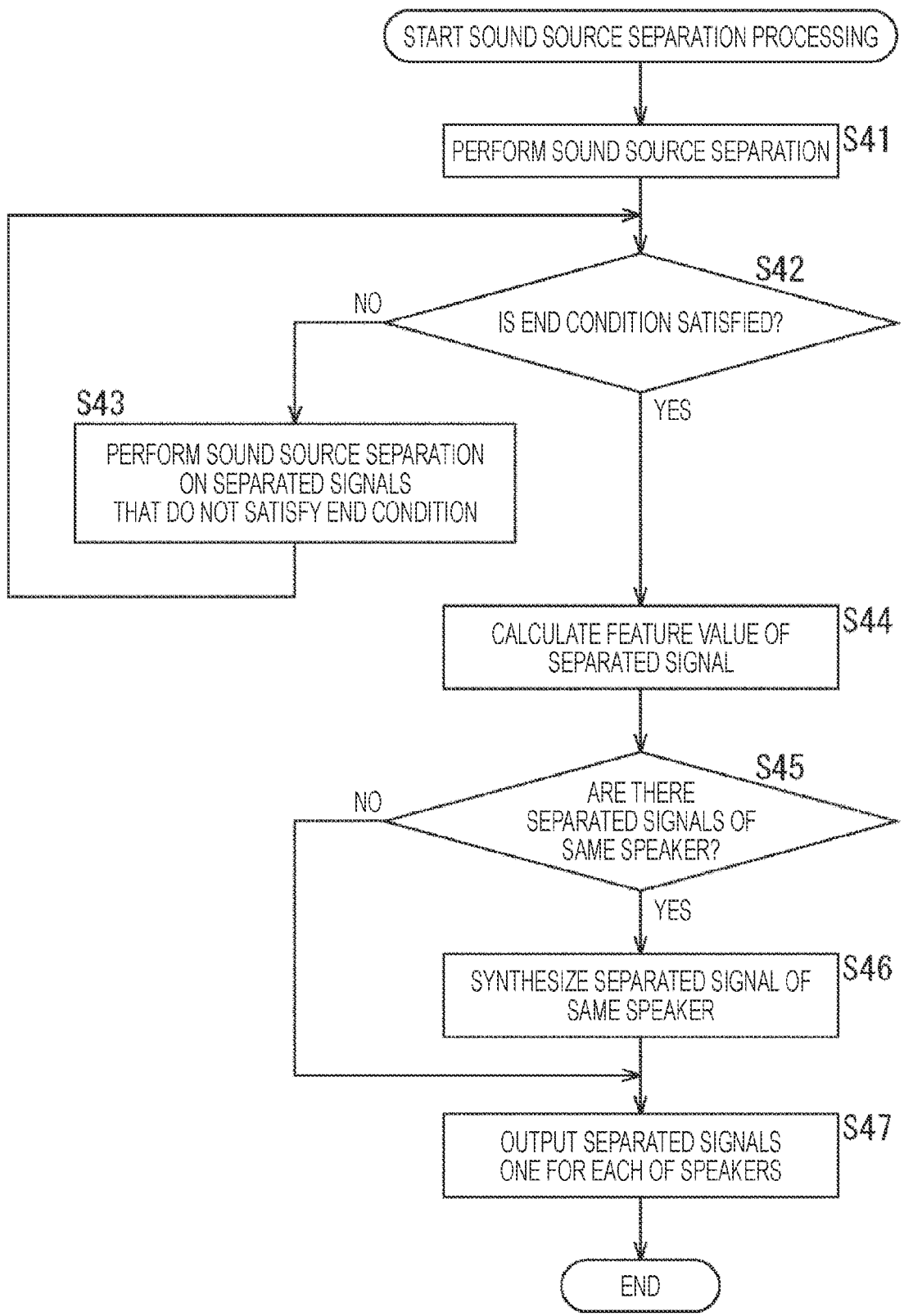
FIG. 6 is a flowchart illustrating sound source separation processing.

Then, for example, in step S12 in FIG. 3 or step S42 in FIG. 6, the end determination unit 22 performs a computation based on the single-speaker determination model that is retained and a separated signal obtained by sound source separation, and determines whether or not the number of speakers of an utterance included in the separated signal is one. In other words, it is determined whether or not the separated signal includes only an utterance of a single speaker.

Then, the end determination unit 22 determines that the end condition is satisfied if an obtained result of the determination indicates that the number of speakers of the utterance included in each of all the separated signals is one, that is, each of the separated signals includes only an utterance of a single speaker.

In the determination using such a single-speaker determination model, a task is simplified as compared with estimation using a number-of-speakers estimation model for estimating the number of speakers of an utterance included in a separated signal. Therefore, there is an advantage that a more high-performance acoustic model (single-speaker determination model) can be obtained with a smaller model scale. That is, sound source separation can be performed more easily as compared with a case of using the number-of-speakers estimation model.

By using a single-speaker determination model to determine whether the end condition is satisfied as described above, it is possible to reduce the overall processing amount (the number of times of processing) and the processing time of the sound source separation processing described with reference to FIGS. 3 and 6.

Furthermore, for example, in a case of using a single-speaker determination model or the like to perform an end determination, in the sound source separation processing described with reference to FIGS. 3 and 6, it is also possible to first perform an end determination, that is, whether or not the end condition is satisfied, and then perform recursive sound source separation in accordance with a result of the determination.

In this case, for example, when the single-speaker determination model is used for the end determination, the recursive sound source separation is performed by using the single-speaker determination model on a separated signal determined to be not a separated signal including only an utterance of a single speaker.

In addition, the sound source separation unit 21 may use a number-of-speakers determination model for determining a rough number of speakers to select a sound source separation model for recursive sound source separation.

Specifically, for example, a case is assumed in which the sound source separation unit 21 retains a number-of-speakers determination model for determining whether an input acoustic signal is a signal including utterances of two or less speakers or a signal including utterances of three or more speakers, a two-speaker separation model, and a three-speaker separation model.

In this case, the sound source separation unit 21 determines the number of speakers by using the number-of-speakers determination model on an input acoustic signal or a separated signal obtained by sound source separation, and selects either the two-speaker separation model or the three-speaker separation model as a sound source separation model to be used for sound source separation.

That is, for example, for an input acoustic signal or a separated signal determined to be a signal including utterances of three or more speakers, the sound source separation unit 21 performs sound source separation using the three-speaker separation model.

On the other hand, for an input acoustic signal or a separated signal determined to be a signal including utterances of two or less speakers, the sound source separation unit 21 performs sound source separation using the two-speaker separation model.

In this way, an appropriate sound source separation model can be selectively used for sound source separation.

Other Modified Example 2

Use of Language Information

Furthermore, in the second embodiment or the fourth embodiment, a same speaker determination may be performed on the basis of language information of a plurality of separated signals. In particular, here, an example will be described in which text information indicating contents of a speech (utterance) based on a separated signal is used as the language information.

In such a case, for example, a same speaker determination unit 61 of the signal processing device 51 performs speech recognition processing on separated signals, one for each of the speakers, supplied from the end determination unit 22, and converts speeches of separated signals, one for each of the speakers, into texts. That is, text information indicating contents of an utterance based on the separated signal is generated by the speech recognition processing.

Then, in a case where the texts, that is, the contents of the utterance, indicated by the text information of any two or more separated signals are merged (integrated) and the merged text forms a sentence, the same speaker determination unit 61 determines that the separated signals are of the same speaker.

Specifically, for example, in a case where utterances indicated by pieces of text information, one for each of two separated signals, are the same in timing and contents, the two separated signals are assumed to be of the same speaker.

Furthermore, for example, in a case where utterances indicated by pieces of text information of two separated signals are different in timing, but these utterances, when integrated into one utterance, form a meaningful sentence, the two separated signals are assumed to be of the same speaker.

In this way, using language information such as text information improves the accuracy of determining the same speaker, and thus the separation performance can be improved.

Other Modified Example 3

Use of Same Speaker Determination Model

Furthermore, in the second embodiment or the fourth embodiment, a same speaker determination may be performed on the basis of a same speaker determination model for determining whether or not each of any two separated signals includes an utterance of the same speaker, that is, whether or not the two separated signals are signals of the same speaker.

Here, the same speaker determination model is an acoustic model in which two separated signals are input and a determination result as to whether the speakers of the utterances included one in each of the separated signals are the same or different is output.

In such a case, for example, the same speaker determination unit 61 of the signal processing device 51 retains a same speaker determination model obtained in advance by learning.

On the basis of the same speaker determination model that is retained and separated signals, one for each of the speakers, supplied from the end determination unit 22, the same speaker determination unit 61 determines, for all possible combinations, whether or not the speakers of the utterances included one in each of the two separated signals are the same.

In the same speaker determination using such a same speaker determination model, the task is simplified as compared with the case of the speaker identification model described above. Therefore, there is an advantage that a more high-performance acoustic model (same speaker determination model) can be obtained with a smaller model scale.

Note that, at the time of determining the same speaker, separated signals of the same speaker may be specified by combining a plurality of optional methods such as the method using the distance between feature values, the method using language information, and the method using a same speaker determination model described above.

Configuration Example of Computer

Meanwhile, the series of pieces of processing described above can be executed not only by hardware but also by software. In a case where the series of pieces of processing is executed by software, a program constituting the software is installed on a computer. Here, the computer includes a computer incorporated in dedicated hardware, or a general-purpose personal computer capable of executing various functions with various programs installed therein, for example.

Figure 7:
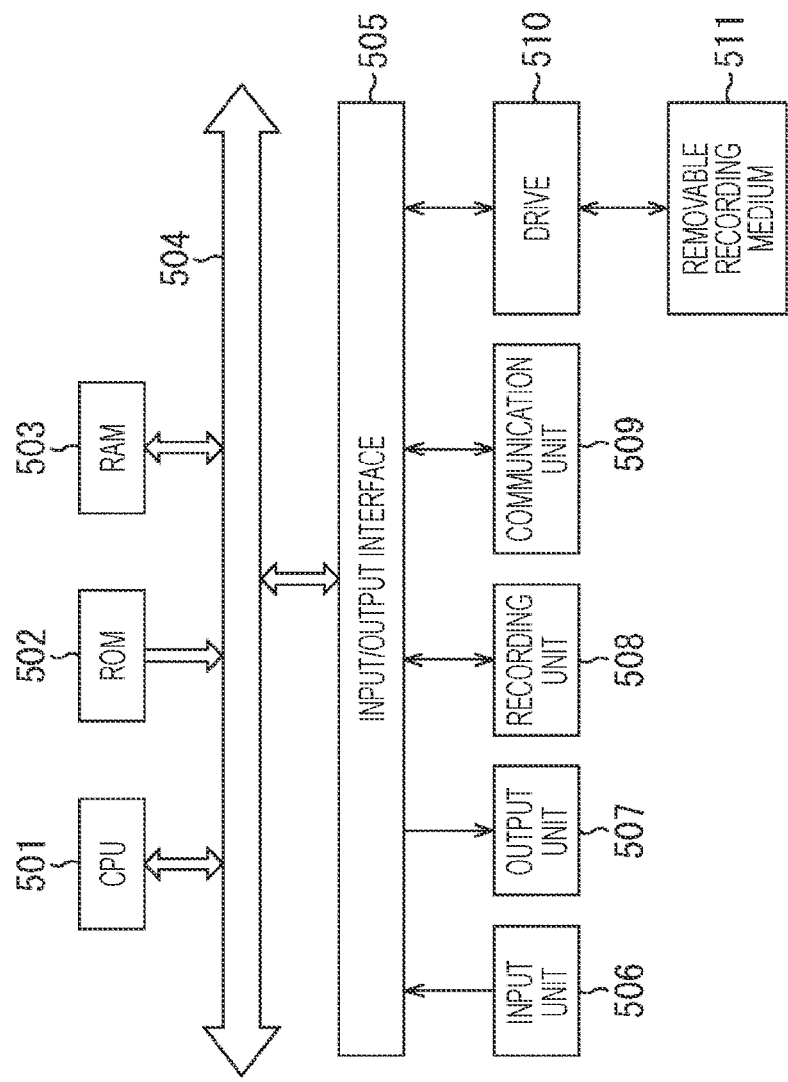
FIG. 7 is a diagram illustrating a configuration example of a computer.

FIG. 7 is a block diagram illustrating a configuration example of hardware of a computer that executes the series of pieces of processing described above in accordance with a program.

In the computer, a central processing unit (CPU) 501, a read only memory (ROM) 502, and a random access memory (RAM) 503 are connected to each other by a bus 504.

The bus 504 is further connected with an input/output interface 505. The input/output interface 505 is connected with an input unit 506, an output unit 507, a recording unit 508, a communication unit 509, and a drive 510.

The input unit 506 includes a keyboard, a mouse, a microphone, an imaging element, or the like. The output unit 507 includes a display, a speaker, or the like. The recording unit 508 includes a hard disk, a non-volatile memory, or the like. The communication unit 509 includes a network interface or the like. The drive 510 drives a removable recording medium 511 such as a magnetic disk, an optical disk, a magneto-optical disk, or a semiconductor memory.

To perform the series of pieces of processing described above, the computer having a configuration as described above causes the CPU 501 to, for example, load a program recorded in the recording unit 508 into the RAM 503 via the input/output interface 505 and the bus 504 and then execute the program.

The program to be executed by the computer (CPU 501) can be provided by, for example, being recorded on the removable recording medium 511 as a package medium or the like. Furthermore, the program can be provided via a wired or wireless transmission medium such as a local area network, the Internet, or digital satellite broadcasting.

Inserting the removable recording medium 511 into the drive 510 allows the computer to install the program into the recording unit 508 via the input/output interface 505. Furthermore, the program can be received by the communication unit 509 via a wired or wireless transmission medium and installed into the recording unit 508. In addition, the program can be installed in advance in the ROM 502 or the recording unit 508.

Note that the program to be executed by the computer may be a program that performs the pieces of processing in chronological order as described in the present specification, or may be a program that performs the pieces of processing in parallel or when needed, for example, when the processing is called.

Furthermore, embodiments of the present technology are not limited to the embodiments described above but can be modified in various ways within a scope of the present technology.

For example, the present technology can have a cloud computing configuration in which a plurality of devices shares one function and collaborates in processing via a network.

Furthermore, each step described in the flowcharts described above can be executed by one device or can be shared by a plurality of devices.

Moreover, in a case where a plurality of pieces of processing is included in one step, the plurality of pieces of processing included in that step can be executed by one device or can be shared by a plurality of devices.

Moreover, the present technology can also have the following configurations.

(1)

A signal processing device including:

a sound source separation unit that recursively performs sound source separation on an input acoustic signal by using a predetermined sound source separation model learned in advance to separate a predetermined sound source from an acoustic signal for learning including the predetermined sound source.

(2)

The signal processing device according to (1), in which the sound source separation unit performs the sound source separation to separate a separated signal of an utterance of a speaker from the acoustic signal.

(3)

The signal processing device according to (2), in which the sound source separation unit performs the sound source separation on the acoustic signal in which the number of speakers is unknown.

(4)

The signal processing device according to (2) or (3), in which the sound source separation model is a speaker separation model learned to separate the acoustic signal for learning including utterances of two speakers into a separated signal including an utterance of one speaker and a separated signal including an utterance of another speaker.

(5)

The signal processing device according to (2) or (3), in which the sound source separation model is a speaker separation model learned to separate the acoustic signal for learning including utterances of three speakers into three separated signals, each of which includes a corresponding one of the utterances of the three speakers.

(6)

The signal processing device according to (2) or (3), in which the sound source separation model is a speaker separation model learned to separate the acoustic signal for learning including utterances of any plurality of speakers into a separated signal including an utterance of one speaker and a separated signal including utterances of remaining speakers excluding the one speaker among the plurality of speakers.

(7)
The signal processing device according to any one of (2) to (6), in which
the sound source separation unit recursively performs the sound source separation by using a plurality of sound source separation models that are different one from each other as the predetermined the sound source separation model.

(8)
The signal processing device according to any one of (2) to (7), further including:
an end determination unit that determines whether or not to end the recursive sound source separation on the basis of the separated signal obtained by the sound source separation.

(9)
The signal processing device according to (8), in which
the end determination unit determines to end the recursive sound source separation in a case where one of the separated signals obtained by the sound source separation is a silent signal.

(10)
The signal processing device according to (8), in which
the end determination unit determines that the recursive sound source separation is to be ended in a case where it is determined, on the basis of a single-speaker determination model for determining whether or not the number of speakers of an utterance included in the separated signal is one and the separated signal, that the number of speakers of the utterance included in the separated signal obtained by the sound source separation is one.

(11)
The signal processing device according to any one of (2) to (10), further including:
a same speaker determination unit that performs a same speaker determination as to whether or not a plurality of the separated signals obtained by the recursive sound source separation is signals of the same speaker, and synthesizes a separated signal from a plurality of the separated signals of the same speaker.

(12)
The signal processing device according to (11), in which
the same speaker determination unit performs the same speaker determination by clustering the separated signals.

(13)
The signal processing device according to (12), in which
the same speaker determination unit calculates feature values of the separated signals, and determines that, in a case where a distance between the feature values of two of the separated signals is equal to or less than a threshold value, the two separated signals are signals of the same speaker.

(14)
The signal processing device according to (12), in which
the same speaker determination unit performs the same speaker determination on the basis of a correlation between temporal energy variations of two of the separated signals.

(15)
The signal processing device according to (11), in which
the same speaker determination unit performs the same speaker determination on the basis of language information of a plurality of the separated signals.

(16)
The signal processing device according to (11), in which
the same speaker determination unit performs the same speaker determination on the basis of a same speaker determination model for determining whether two of the separated signals are signals of the same speaker.

(17)
A signal processing method including:
recursively performing, by a signal processing device, sound source separation on an input acoustic signal by using a predetermined sound source separation model learned in advance to separate a predetermined sound source from an acoustic signal for learning including the predetermined sound source.

(18)
A program for causing a computer to execute processing including a step of:
recursively performing sound source separation on an input acoustic signal by using a predetermined sound source separation model learned in advance to separate a predetermined sound source from an acoustic signal for learning including the predetermined sound source.

REFERENCE SIGNS LIST

11 Signal processing device
21 Sound source separation unit
22 End determination unit
51 Signal processing device
61 Same speaker determination unit

The invention claimed is:
1. A signal processing device, comprising:
a central processing unit (CPU) configured to:
receive an input acoustic signal associated with a plurality of sound sources;
execute, based on a sound source separation model learned in advance to separate a sound source from an acoustic signal, a sound source separation on the received input acoustic signal;
generate, based on the sound source separation, a plurality of separated signals;
determine that the sound source separation on a separated signal of the plurality of separation signals is to be ended based on an end condition,
wherein the end condition is a condition that an average energy level of the separated signal of the plurality of separated signals is equal to or less than a specific threshold value;
execute the sound source separation on the plurality of separated signals that does not satisfy the end condition; and
recursively execute the sound source separation, on the plurality of separated signals that does not satisfy the end condition, until each of the plurality of separated signals satisfies the end condition,
wherein the sound source separation model is trained as a N-source model, and
a number of the plurality of sound sources is greater than N.
2. The signal processing device according to claim 1, wherein the CPU is further configured to perform the sound source separation to separate an utterance of a speaker from the received input acoustic signal.

3. The signal processing device according to claim 2, wherein
the CPU is further configured to perform the sound source separation on the received input acoustic signal in which a number of speakers is unknown.

4. The signal processing device according to claim 2, wherein
the sound source separation model is a speaker separation model learned to separate the received input acoustic signal including utterances of two speakers into the plurality of separated signals, and
the plurality of separated signals includes:
a first separated signal including an utterance of a first speaker of the two speakers; and
a second separated signal including an utterance of a second speaker of the two speakers.

5. The signal processing device according to claim 2, wherein
the sound source separation model is a speaker separation model learned to separate the received input acoustic signal including utterances of three speakers into the plurality of separated signals, and
the plurality of separated signals includes three separated signals, each of which includes an utterance of a corresponding speaker of the three speakers.

6. The signal processing device according to claim 2, wherein
the sound source separation model is a speaker separation model learned to separate the received input acoustic signal including utterances of a plurality of speakers into the plurality of separated signals, and
the plurality of separated signals includes:
a first separated signal including an utterance of one speaker among the plurality of speakers; and
a second separated signal including the utterances of remaining speakers excluding the one speaker among the plurality of speakers.

7. The signal processing device according to claim 2, wherein
the CPU is further configured to recursively perform the sound source separation based on a plurality of sound source separation models as the sound source separation model, and
the plurality of sound source separation models is different.

8. The signal processing device according to claim 1, wherein
the CPU is further configured to determine, based on a single speaker determination model, that the recursive sound source separation is to be ended in a case where a number of speakers associated with utterances included in each of the plurality of separated signals is one, and
the single speaker determination model is an acoustic model that determines the number of speakers associated with the utterances included in each of the plurality of separated signals.

9. The signal processing device according to claim 2, wherein the CPU is further configured to:
perform a same speaker determination based on each of the plurality of separated signals obtained by the recursive sound source separation corresponds to signals of a same speaker; and
synthesize a separated signal from the plurality of separated signals of the same speaker.

10. The signal processing device according to claim 9, wherein the CPU is further configured to perform the same speaker determination by clustering the plurality of separated signals.

11. The signal processing device according to claim 10, wherein
the CPU is further configured to:
calculate feature values of the plurality of separated signals; and
determine that, in a case where a distance between the feature values of two separated signals of the plurality of separated signals is equal to or less than a threshold value, the two separated signals are signals of the same speaker.

12. The signal processing device according to claim 10, wherein the CPU is further configured to perform the same speaker determination based on a correlation between temporal energy variations of two of the plurality of separated signals.

13. The signal processing device according to claim 9, wherein the CPU is further configured to perform the same speaker determination based on a language information of the plurality of separated signals.

14. The signal processing device according to claim 9, wherein the CPU is further configured to perform the same speaker determination based on a same speaker determination model that determines whether two of the plurality of separated signals are signals of the same speaker.

15. A signal processing method, comprising:
receiving an input acoustic signal associated with a plurality of sound sources;
executing, based on a sound source separation model learned in advance to separate a sound source from an acoustic signal, a sound source separation on the received input acoustic signal;
generating, based on the sound source separation, a plurality of separated signals;
determining that the sound source separation on a separated signal of the plurality of separation signals is to be ended based on an end condition, wherein the end condition is a condition that an average energy level of the separated signal of the plurality of separated signals is equal to or less than a specific threshold value;
executing the sound source separation on the plurality of separated signals that does not satisfy the end condition; and
recursively executing the sound source separation, on the plurality of separated signals that does not satisfy the end condition, until each of the plurality of separated signals satisfies the end condition,
wherein the sound source separation model is trained as a N-source model, and
a number of the plurality of sound sources is greater than N.

16. A non-transitory computer-readable medium having stored thereon, computer-executable instructions which, when executed by a computer, cause the computer to execute operations, the operations comprising:
receiving an input acoustic signal associated with a plurality of sound sources;
executing, based on a sound source separation model learned in advance to separate a sound source from an acoustic signal, a sound source separation on the received input acoustic signal;

generating, based on the sound source separation, a plurality of separated signals;

determining that the sound source separation on a separated signal of the plurality of separation signals is to be ended based on an end condition, wherein the end condition is a condition that an average energy level of the separated signal of the plurality of separated signals is equal to or less than a specific threshold value;

executing recursively performing the sound source separation on the plurality of separated signals that does not satisfy the end condition; and recursively executing the sound source separation, on the plurality of separated signals that does not satisfy the end condition, until each of the plurality of separated signals satisfies the end condition, wherein the sound source separation model is trained as a N-source model, and a number of the plurality of sound sources is greater than N.

* * * * *